Patented Mar. 6, 1923.

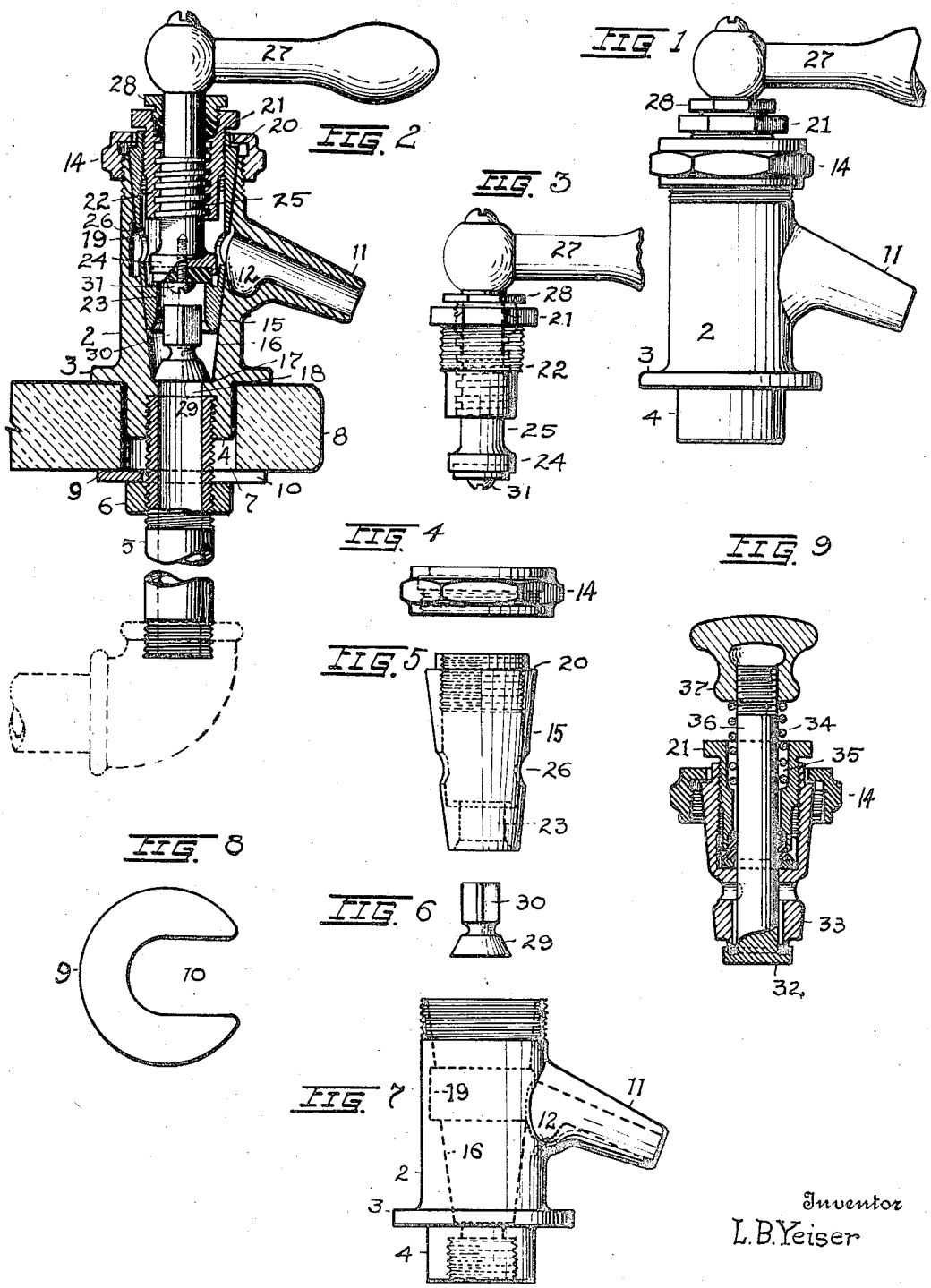

1,447,457

UNITED STATES PATENT OFFICE.

LEON B. YEISER, OF CLEVELAND, OHIO.

FAUCET OR BATH COCK.

Application filed September 15, 1919. Serial No. 323,881.

*To all whom it may concern:*

Be it known that LEON B. YEISER, citizen of the United States, residing at Cleveland, in the county of Cuyahoga and State of Ohio, has invented certain new and useful Improvements in Faucets or Bath Cocks, of which the following is a specification.

This invention consists in an improvement in valves, and more particularly in faucets, bibbs or cocks, and the object of the invention is to provide a valve body with a removable tapered plug, which is ground within upper and lower correspondingly-tapered seats within the body. This tapered plug is also provided with an inlet opening surrounded by a valve seat and particularly constructed internally to removably hold a valve member in operating relation opposite said inlet opening and seat. A screw collar is used to press and hold the plug to its ground seat within the body, and a check valve is also confined within the body by the tapered plug where it is adapted to be held open by the movable valve member at all times except when such valve member is bodily removed from the plug, its function being to automatically stop the outflow of water whenever the valve member is removed for inspection and repairs.

In the accompanying drawing, Fig. 1 is a side view, and Fig. 2 a vertical sectional view of a faucet or bath cock embodying my improvements. Fig. 3 is a side view of the screw sleeve and movable valve member as it appears when removed from the tapered plug. Fig. 4 is a side elevation of the screw collar, and Fig. 5 is a similar view of the tapered plug. Fig. 6 shows the check valve alone, and Fig. 7 is a side view of the valve body alone. Fig. 8 is a plan view of the washer used to fasten the valve body to the base slab, and Fig. 9 is a sectional view of a modified form of tapered plug and valve member which may be placed within the valve body as a substitute for the plug and valve member shown in the other figures.

The invention comprises a cylindrical cast metal body 2 having a base flange 3 and a short round extension 4 with internal screw-threads adapted to provide direct coupling connection with a threaded water supply pipe 5. A nut 6 on the pipe, and the extension 4 are of the same diameter so that the valve body, nut and pipe may be introduced together through the opening 7 in the slab 8, and a separate washer 9 with an opening 10 in its side is slipped over the pipe between the bottom side of the slab and nut 6 to permit the body to be clamped in place upon the slab, either by turning the nut or the valve body. This permits quick assembly of the valve body to the slab, and also a simple and inexpensive construction of valve as a whole.

Body 2 is a plain cylinder having a short straight spout 11 at one side with a drip chamber or recess 12 at its inner end, and the neck of the body is screw-threaded to permit the attachment of a screw-collar 14 wherewith a tapered removable plug 15 may be pressed downwardly in tight-fitting relation within the body, which is formed with a flaring chamber or tapered bore 16 extending downwardly on straight lines from the upper edge of the neck to an annular shoulder 17 where a reduced intake passage 18 is provided in extension 4. An annular channel 19 internally of the body subdivides and intersects the tapered bore approximately midway of its length opposite spout 4 into two separated tapered seats having exactly the same taper to permit the plug to be ground uniformly thereto. In other words, the round tapered plug 15 has the same tapering formation as bore 16 above and below the water-distributing channel 19, and an exceedingly effective leak-proof joint is provided by grinding the plug its full length within both seats in the body and employing the screw-collar 14 to press and hold the plug to said tapered seats. Screw collar 14 is sleeved over the reduced upper end of the plug and bears down upon an end shoulder 20 on the plug when screwed down upon the neck thereon, and this collar also acts to lift and withdraw the plug from its seat when unscrewed from the neck; especially when the overhanging head or flange 21 of a removable sleeve or thimble 22 is in place within the plug as shown in Fig. 1.

Sleeve 22 is screwed within the upper end of plug 15 and is provided either with a quick screw thread internally as seen in Fig. 1, or with a plain opening of differential diameter centrally therethrough as seen in Fig. 9. The construction shown in Fig. 1 is designed to permit the closing of the water passage 23 in the end of the plug by a compression valve 24 having a screw-threaded stem 25 extending upwardly through the plug and sleeve, and the water from passage 23 escapes to spout 11 through openings 26 in the sides of the plug opposite channel 19. The upper end of stem 25 has a detachable handle 27, and the upper portion of screw sleeve 22 contains packing adapted to be compressed around the valve stem by a gland nut 28. The opening movement of valve 24 is limited by the travel of the screw thread on the stem within the screw sleeve 22, and this limited movement is taken advantage of in regulating the movement of a check valve 29 confined within the lower end of the tapered bore beneath plug 15. This check valve has a flaring valve head adapted to seat within the flaring end of the plug to close the entrance to passage 23 whenever the main valve 24 is removed from the plug for inspection and repairs. That is, the water pressure seats said check valve under those conditions, but not otherwise because the ribbed guiding stem 30 of the check valve is made long enough to engage the washer holding screw 31 at the end of main valve 24 and thereby hold the check valve open when the main valve 24 is raised to its limit under ordinary usage. In brief, the check valve cannot close when the main valve is wide open, but is adapted to close passage 23 when the valve is removed.

Now referring to the plug and valve parts shown in Fig. 9, a self-closing effect is obtained by employing a valve 32 adapted to seat against the lower outer end of a tapered plug 33 under the upward lift of a coiled spring 34 seated in a recess 35 within the upper part of the plug and sleeved upon the valve stem 36 in end bearing engagement with a button or head 37 screwed upon the upper end of the stem and longitudinally adjustable thereon to regulate the tension of the spring and the extent of movement of valve 32 relatively to the seat at the lower end of the plug.

Body 2 will seat and hold either the valve plug 33 or the plug 15, thereby permitting substitution of one for the other prior to or subsequent to the installation of body 2 in a lavatory or other place of use. Thus, when either plug is in place the tapered ground joint between the plug and body provides an absolutely water-tight union without the aid of packing or any other medium other than screw collar 14, and the joint is not affected by extreme changes in temperature inside or outside of the body.

It will be observed that the plug has no means of its own for dislodging it from its ground in joint, and my experience is that it is practically impossible to move it from its seat without special means for this purpose. Such means are provided in this instance by the screw collar 14 and the flange 21 of sleeve 22, which extends outward over said collar sufficiently to be engaged by said collar when the collar is unscrewed or raised by turning to the left and which forcibly raises the plug because the sleeve 22 is screwed into the plug.

What I claim is:

1. In a faucet or cock, a body having intake and outlet water passages and a tapered bore communicating with said passages, a tapered plug ground within said tapered bore having a central water passage, a screw collar adapted to secure said plug removably within said body, a valve member adapted to control the flow of water through the passage in said plug, a sleeve removably screwed within the outer end of said plug and having a flange overlying said collar and adapted to support and hold said valve in operating position therein, and means wherewith to operate said valve member.

2. In a faucet or cock, a body having water passages and a tapered bore longitudinally therein, a tapered plug ground within said tapered bore having an end intake and side openings centrally between its ends adapted to have open communication with said water passages in said body, a screw collar adapted to hold said plug within said body, a screw-threaded sleeve removably mounted within the outer end of said plug, a valve member within said plug adapted to control the flow of water through its intake and side openings, and said valve member having a screw-threaded stem in screw-engagement with said sleeve and provided with an operating handle at its outer end.

3. In a faucet or cock, a body having a spout and a tapered bore longitudinally therein opposite said spout and provided with a screw-threaded extension with a reduced water passage therein opposite the smaller end of said tapered bore, a tapered plug ground within said tapered bore having a central end passage and an internal chamber with a valve seat and side openings, a valve member within said plug adapted to engage the valve seat therein, a screw sleeve removably mounted within the outer end of said plug, a screw-threaded valve stem for said valve member in screw-engagement with said sleeve, a handle for said valve stem, and means adapted to secure said plug tightly and removably within said body.

Signed at Cleveland, in the county of Cuyahoga and State of Ohio, this 11th day of Sept., 1919.

LEON B. YEISER.